Figure 1:
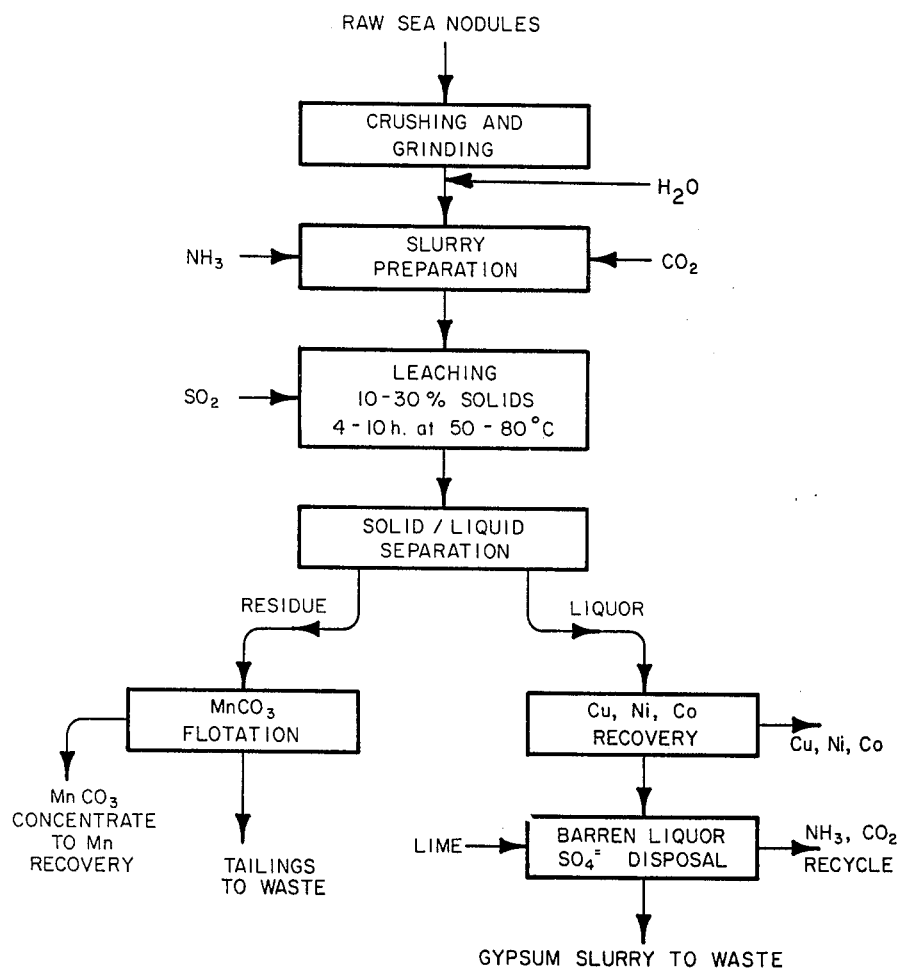

United States Patent [19]

Subramanian et al.

[11] 4,085,188

[45] Apr. 18, 1978

[54] REDUCTION LEACHING OF RAW SEA NODULES WITH SULFIDES

[75] Inventors: Kohur Nagaraja Subramanian, Mississauga; Gerald Vernon Glaum, Oakville, both of Canada

[73] Assignee: The International Nickel Company, Inc., New York, N.Y.

[21] Appl. No.: 664,752

[22] Filed: Mar. 8, 1976

[30] Foreign Application Priority Data

Mar. 24, 1975 Canada .................................. 222914
Mar. 4, 1976 Canada .................................. 247157

[51] Int. Cl.$^2$ ..................... C01G 3/14; C01G 51/12; C01G 53/12

[52] U.S. Cl. ....................... 423/32; 423/50; 423/53; 423/150; 423/33; 423/DIG. 4

[58] Field of Search ................ 423/27, 32, 33, 49, 423/50, 419, 150, 143, 53; 75/103, 117, 119

[56] References Cited

U.S. PATENT DOCUMENTS 1,934,626  11/1933  Nagelvoort ........................... 423/562
3,262,752  7/1966  Moore et al. ......................... 423/419
3,950,487  4/1976  Pemsler .................................. 423/32

FOREIGN PATENT DOCUMENTS 515,817  8/1955  Canada .................................. 75/103
44,611  1/1969  Japan .................................... 423/49

OTHER PUBLICATIONS

Iammartino "Metals From Mn Nodules", *Chemical Engineering,* Nov. 25, 1974, pp. 52, 53.

*Primary Examiner*—O. R. Vertiz
*Assistant Examiner*—Brian E. Hearn
*Attorney, Agent, or Firm*—Miriam W. Leff; Ewan C. MacQueen

[57] ABSTRACT

A process for extracting metal values from sea nodules is provided in which nickel, cobalt and copper values are selectively extracted by leaching raw sea nodules in an aqueous ammoniacal medium in the presence of a reducing agent for tetravalent manganese and carbonate to precipitate the reduced manganese as manganous carbonate.

11 Claims, 2 Drawing Figures

REDUCTION LEACHING OF RAW SEA NODULES WITH SULFIDES

This invention relates to a hydrometallurgical process for extracting metal values from manganiferous oxide ores containing a major amount of manganese and iron and a minor amount of nonferrous metal values such as nickel, cobalt, copper and molybdenum, and more particularly to a process for selectively extracting and separating nickel, cobalt and copper from such ores.

BACKGROUND OF THE INVENTION

1. Field of Invention

The process in accordance with the present invention is applicable generally to manganiferous oxide ores that contain a major amount of manganese in the tetravalent state and iron and a minor amount of nonferrous metals including at least one of the metals nickel, cobalt or copper. It will be described herein, however, in conjunction with deep sea nodules. The nodular deposits are found in large quantities on the ocean floor and are a potential source of metals. The physical and chemical nature of these deposits vary depending on their location. Typical deposits can contain, for example, up to about 2% nickel, up to about 2% copper, up to about 1% cobalt, up to about 25% iron and up to about 40% manganese. Since the components are tied in intimate and complex association they are not amenable to separation by conventional beneficiation procedures. For the same reason extraction of the valuable metals is difficult.

2. Prior Art

Numerous methods have been proposed for extracting metal values from sea nodules. Among them are processes which use sulfur dioxide, to extract nickel, copper and cobalt in neutral or acidic media. U.S. Pat. No. 3,169,856, for example, uses sulfur dioxide or nitrogen dioxide to preferentially dissolve the values in the manganese phase leaving the iron phase in the residue for subsequent treatment. Similarly, German Pat. No. 2,150,785 leaches the ores, preferably in the presence of added $MnSO_4$, with $SO_2$ to dissolve preferentially the manganese phase leaving the iron phase in the residue for further acid treatment. In U.S. Pat. No. 3,810,827, nodules are treated with $SO_2$ in a fluid bed in the absence of oxygen to sulfate preferentially the manganese content of the nodules. Leaching the sulfated nodules dissolves manganese leaving the remaining nonferrous values in the residue for dissolution in a subsequent treatment. In each of these processes, most of the manganese content of the nodules is dissolved in a weakly acidic liquor containing at least a portion of the copper, nickel, or cobalt present in the nodules. Separation and recovery of the valuable nonferrous metals and manganese from these solutions may be complex and expensive.

Other processes are known to utilize leaching in ammoniacal solutions to extract the valuable nonferrous metals leaving manganese and iron in the residue. Among these are processes such as U.S. Pat. No. 3,471,285 which involve high temperature selective reduction of the nodules prior to leaching in the ammoniacal medium. These processes are becoming less attractive because of the large energy requirement to dry and heat the nodules. Another process, U.S. Pat. No. 3,728,105, leaches the nodules in ammoniacal media at temperatures between 100° and 300° C. under atmospheres containing $H_2$ and/or CO at 300 to 1000 psig total pressure to reduce the Mn and selectively extract the Cu, Ni, and Co. The cost of pressure vessels to withstand such high temperatures and pressures in addition to the large energy requirement for heating a slurry makes this process unattractive.

It is an object of the present invention to provide an improved method for treating manganese oxide ores, especially manganiferous sea nodules, in which copper, nickel and cobalt are selectively separated from manganese. Another object is to provide a method in which neither thermal pretreatment nor drying of the ore is required. A further object is to provide a hydrometallurgical method in which leaching of the ore is carried out under essentially atmospheric pressures. It is a still further object to provide a process for extracting metal values from manganese oxide ores in which early separation of metals including copper, nickel and/or cobalt from manganese is effected, thereby avoiding complex separation procedures. It is a further object to provide a leach residue from which manganese recovery can be achieved by a simple procedure.

These and other objects will become apparent from the following description taken in conjunction with the accompanying drawings.

THE INVENTION

In accordance with the present invention a manganiferous ore, such as deep sea nodules, containing a major amount of manganese and a minor amount of at least one of the nonferrous metals nickel, copper, cobalt, and molybdenum is leached in an aqueous ammoniacal medium in the presence of a reducing agent and a manganous carbonate precipitant. The manganese is present in the ore mainly in the tetravalent state, e.g., as $MnO_2$, and the main purpose of the reducing agent is to reduce tetravalent manganese to the divalent state. At least one of the nonferrous metal values, e.g., nickel, cobalt, copper, and molybdenum are extracted into the leach solution and iron and manganese separated into the residue.

The nickel, cobalt, copper and molybdenum values are extracted into the ammoniacal medium as amine complexes. In addition to the $NH_4^+$, the ammoniacal medium contains a carbonate which will precipitate the reduced manganese as manganous carbonate. The carbonate precipitant is, for example, $CO_2$, $(NH_4)_2CO_3$, or an alkali metal carbonate. $CO_2$ and $(NH_4)_2CO_3$ are preferred reagents. In the presence of carbonate, crystalline manganous carbonate is precipitated and the desired concentration of less than 50 ppm manganese in the leach solution is readily achieved. Also, manganous carbonate can be recovered from the leach residue, if desired, by conventional flotation technology. In the absence of carbonate, noncrystalline manganous hydroxide precipitates slowly and low manganese concentrations in the leach solution are not as readily obtained. Further, separation of manganese present as manganous hydroxide from the leach residue, if desired, would require more complex techniques.

Suitable reducing agents are characterized in that they are capable of reducing tetravalent manganese to the divalent state in an ammoniacal medium under essentially atmospheric pressure or relatively low pressures, and they permit extraction of desired metal values such as copper, nickel and cobalt into the leach solution. Examples of suitable reducing agents are $SO_2$, elemental sulfur, sulfides such as $H_2S$ or $(NH_4)_2S$, $NO_2$, and metallic iron or combinations thereof. SO$_2$ is a preferred reductant because of high extractions of the valuable metals can be effected under mild leaching conditions. Also, it is efficient, commonly available, economical, and in its oxidized form as SO$_4^=$ can be disposed of with minimal environmental impact. With SO$_2$ as the reductant, it is believed that the following overall reaction occurs with respect to the tetravalent manganese:

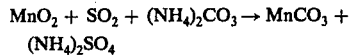
$$MnO_2 + SO_2 + (NH_4)_2CO_3 \rightarrow MnCO_3 + (NH_4)_2SO_4$$

Elemental sulfur, another preferred reductant, requires slightly more severe leaching conditions but sulfur is a low cost reagent and the overall sulfur requirement is significantly lower. With elemental sulfur as the reductant it is believed that the following overall reaction occurs with respect to the tetravalent manganese:

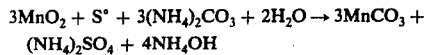
$$3MnO_2 + S^\circ + 3(NH_4)_2CO_3 + 2H_2O \rightarrow 3MnCO_3 + (NH_4)_2SO_4 + 4NH_4OH$$

Sulfides, still another preferred reductant, are relatively expensive and the leaching conditions required are similar to those for elemental sulfur, but the overall sulfur consumption is still lower. With (NH$_4$)$_2$S as the reductant it is believed that the following overall reaction occurs with respect to the tetravalent manganese:

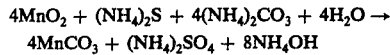
$$4MnO_2 + (NH_4)_2S + 4(NH_4)_2CO_3 + 4H_2O \rightarrow 4MnCO_3 + (NH_4)_2SO_4 + 8NH_4OH$$

Advantageously, the use of elemental sulfur and sulfide can be combined by dissolving up to 4 moles of elemental sulfur per mole of sulfide in an ammoniacal ammonium sulfide solution to form soluble ammonium polysulfide. This reagent retains much of the low cost advantage of elemental sulfur and is soluble in the ammoniacal medium.

The leaching conditions and reagent additions are controlled to ensure that the residue is substantially free of ammonia compounds so as to realize maximum economy of ammonia consumption and minimum harmful environmental impact. In general, the reducing agent is added in an amount substantially stoichiometric to the amount of manganese, and it may be introduced into the leaching medium at the start of the leach or added in stages or continuously throughout the leaching step. The pH of the leaching medium is maintained at not less than about 8 and, preferably, the pH is maintained at about 8.5 to about 9. At a pH below about 8, the nickel, cobalt and copper tend to precipitate from the leach solution. When too low, the pH is suitably adjusted with NH$_3$. At a pH above about 9, the solubility of manganese in the leach solution increases. When too high, the pH is suitably adjusted with CO$_2$.

In general, the leaching medium is provided with from about 60 to 200 grams per liter NH$_3$ and about 40 to about 150 grams per liter of CO$_2$ (or its equivalent of CO$_3^=$) and in suitable proportions to maintain the pH in the range of about 8.5 to about 9. A sufficient amount of NH$_3$ is required to complex all the nonferrous metal values to be extracted, such as Cu, Ni, and Co. However, in the presence of the required amount of CO$_3^=$, i.e., at least stoichiometric, and preferably in excess of the amount required to precipitate all of the manganese in the nodules as manganous carbonate, and at a pH no lower than about 8.5, more than sufficient NH$_3$ is present to complex the nonferrous metals to be extracted.

It is an advantage of the present process that the reductive leach can be carried out at relatively mild conditions so that high temperature-high pressure equipment is not required. In general, the temperature of the leaching slurry is maintained at about 25° C to about 100° C or 130° C. The preferred conditions will depend to some extent on the reducing agent. With SO$_2$, for example, as the reductant the leaching step is carried out at about 25° C to about 100° C and preferably at about 50° to about 80° C. With elemental sulfur the preferred leaching temperature is about 100° C to 125° C. The pressure depends on the gaseous components (such as steam, NH$_3$ and CO$_2$) at the reaction temperature, preferably the reaction is effected at atmospheric pressure. However, if the reaction is carried out at 100° C, the pressure will be about 50 psig (0.35 MPa) and at about 125° C, the pressure will be about 100 psig (0.7 MPa). It will be observed that even at 125° C or 130° C, the pressure is such that high cost, high pressure equipment is not required.

Preferably, the slurry is maintained under reacting conditions until solubilization of the nonferrous metals such as Ni, Cu or Co and the precipitation of the manganese and iron values are substantially maximized. Suitably, a slurry containing NH$_3$ and CO$_2$ and/or (NH$_4$)$_2$CO$_3$ and the reducing agent, e.g. SO$_2$, S°, or ammonium polysulfide, is maintained under reacting conditions for about 4 to 10 hours.

The leach residue can be treated to recover the manganese and/or iron and the nonferrous metal can be recovered from the leach solution by known methods.

THE DRAWINGS

The accompanying figures are schematic flow sheets showing the process for treating raw sea nodules according to two preferred embodiments of this invention. In both embodiments sea nodules are reduced in an ammoniacal ammonium carbonate with a reducing agent.

In the embodiment of FIG. 1, SO$_2$ is the reducing agent and in

Figure 2:
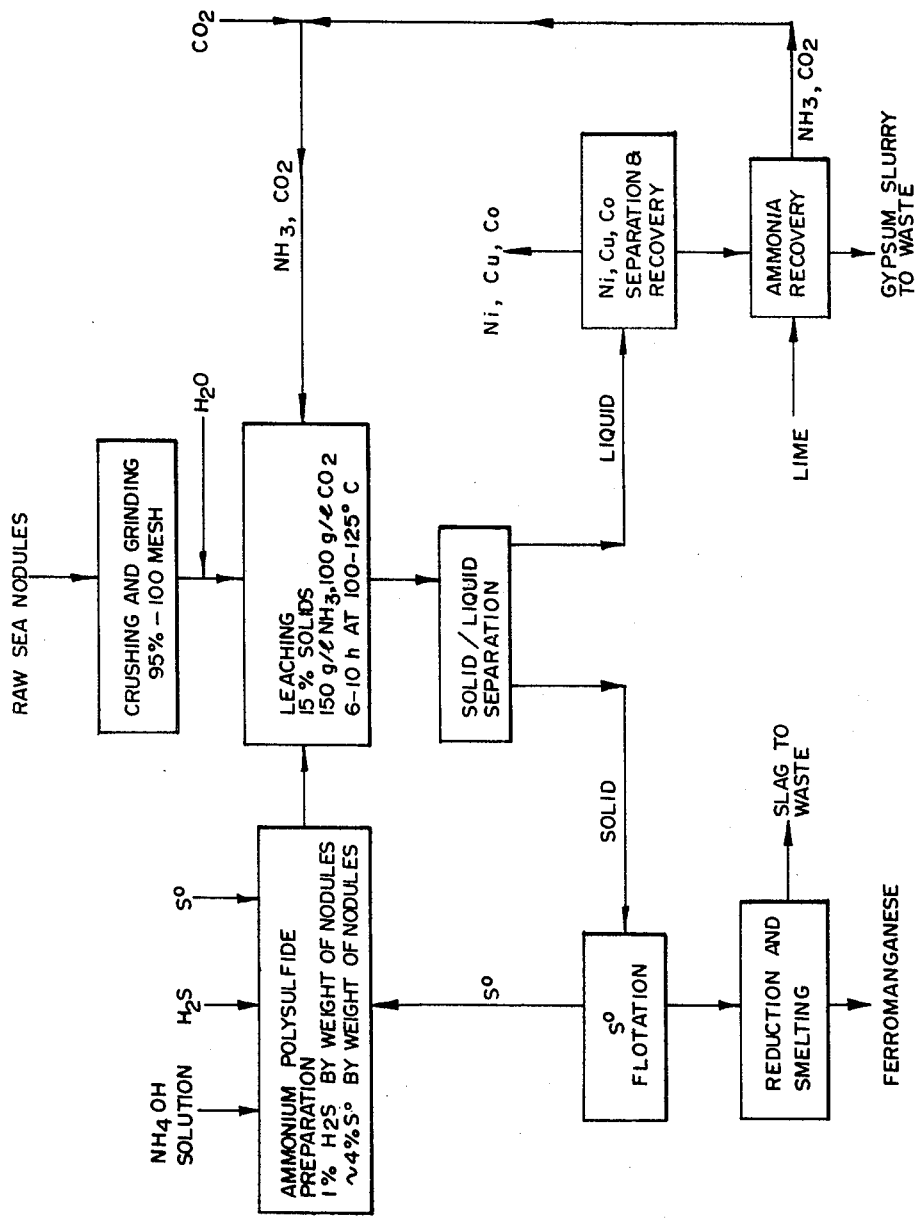

FIG. 2 polysulfide is the reducing agent.

As illustrated in the Figures, raw sea nodules are subjected directly to a reductive leach under relatively mild conditions. Prior to the leaching step, it is advantageous to reduce the particle size of the nodules. The nodules are crushed, ground or otherwise reduced to a fine particle size, e.g., 95% < 48 mesh (TSS), and preferably 95% < 100 mesh. Although the nodules are porous and have a relatively large surface area, the great tortuosity of the pores in the nodules hinders diffusion of reactants and products. Therefore, it is advantageous to reduce the size of the nodules, thereby making the nodules receptive to complete and rapid reactions.

It will be noted that it is not necessary to dry the nodules before they are subjected to reductive leaching. The wet raw nodules are ground and fed directly to an aqueous medium and reduction and precipitation of the manganese is achieved in the leaching medium.

Referring to FIG. 1, raw ocean sea nodules, ground to about minus 100 mesh (TSS), are mixed with water to provide a slurry containing about 10% to 30% solids. NH$_3$ and CO$_2$ are bubbled into the slurry to provide approximately 150 grams per liter of NH$_3$ and 100 grams per liter of CO$_2$. The temperature is maintained at about 50° to 80° C and the pH at about 8.5 to 9. $SO_2$, the reducing agent is fed to the slurry to provide an amount of about 30% to 50% by weight, e.g., about 45%, based on the weight of the sea nodules. The atmosphere is neutral or mildly reducing, air being excluded to prevent the oxidation of $SO_2$. The total leach time is approximately 4 to 10 hours.

Using the above reagents and conditions up to 90% of Cu, Co, and Ni can be extracted into virtually Mn and Fe free solutions.

After separating the leach solution from the residue, the Ni, Co, and Cu values can be recovered from the leach solution by known techniques. For example, free $NH_3$ can be distilled from the solution to cause Cu, Ni, and Co to precipitate as basic carbonates. After solid/liquid separation and washing, the basic carbonate precipitate can be redissolved with $H_2SO_4$. This solution can then be treated to separate and recover the Cu, Ni, and Co by several well-known techniques including, for example, solvent extraction, ion exchange, hydrolysis, sulfide precipitation, and electrolysis.

After separating the barren solution from the basic carbonate precipitate, the $SO_4^=$ in solution is precipitated as gypsum with, for example, lime and the $NH_3$ and $CO_2$ are recovered by distillation.

The leach residue can be treated, for example, to recover a high grade manganous carbonate concentration by well-known flotation techniques. This concentrate could then be treated to recover manganese by pyrometallurgical techniques or by dissolving and electrowinning.

In the embodiment of the present invention in which polysulfide is the reducing agent, illustrated in FIG. 2, preferably, the leaching step is carried out in an aqueous slurry containing about 15% solids and with $NH_3$ and $CO_2$ provided in the amounts of approximately 150 and 100 grams per liter, respectively. The polysulfide reagent solution containing about 85 g/l $NH_3$, 68 g/l $H_2S$, and 256 g/l $S°$ is prepared separately by dissolving about 1% $H_2S$ by weight of nodules in an aqueous ammonia solution at 20° C, then dissolving about 4% elemental sulfur by weight of nodules in the ammoniacal ammonium sulfide solution. After adding the polysulfide reagent solution to the sea nodules slurry, the reaction mixture is maintained at about 100° to 125° C. for about 6 to 10 hours. After separating the resultant leach solution from the residue, the nonferrous metal values other than manganese, e.g., the Ni, Co, and Cu values, can be recovered from solution. The residue can be treated to recover unreacted elemental sulfur by, for example, flotation, and the recovered elemental sulfur can be recycled to preparation of the polysulfide reagent. The remaining product can be treated, e.g., for recovery of $MnCO_3$ and/or ferromanganese.

The following illustrative examples are given for the purpose of enabling those skilled in the art to have a better understanding of the invention.

EXAMPLE 1

In a series of tests, raw sea nodules ground to pass 100 mesh (TSS) are added to an enclosed vessel containing an aqueous ammoniacal medium to provide a pulp density of about 15% solids. The nodules contain 1.22% Ni, 0.97% Cu, 0.20% Co, 25.0% Mn and 5.35% Fe, the composition of the aqueous ammoniacal medium for each of the tests is given in TABLE I. After raising the temperature of the slurry to 60° C, $SO_2$ is bubbled into the baths at a rate of 300 milliliters per minute for 1 to 3 hours and the leach solution is analyzed for Cu, Ni, Co and Mn. The results of typical tests are tabulated in TABLE I. Tests C and D are duplicate runs.

Comparison of the data in Tests A, B, C and D of TABLE I shows that leaching with $NH_4OH$ and $SO_2$ in the presence of $(NH_4)_2SO_4$ or $CO_2$ is more effective for extracting nickel and copper than leaching with $NH_4OH$ and $SO_2$ alone. Further comparison of Test B with Tests C and D show that $CO_2$ is more effective than $(NH_4)_2SO_4$ for extracting nickel and copper. In addition, very low manganese concentrations in the leach solution are more readily attained in the presence of a carbonate. Other advantages of a carbonate precipitate were indicated previously.

EXAMPLE 2

In a series of three tests, raw sea nodules ground to pass 100 mesh (TSS) are added to an enclosed vessel containing an aqueous ammonium medium at 75° C to provide a pulp density of about 15% solids. The nodules contain 1.22% Ni, 0.97% Cu, 0.20% Co, 25.0% Mn, and 5.35% Fe. The aqueous ammoniacal medium contains 150 gpl (grams per liter) $NH_3$, 100 gpl $CO_2$, and 30, 36, or 42% $SO_2$ by weight of nodules added. The slurry is agitated and maintained at 75° C for 6 hours. After filtration and washing the residue and solution are analyzed. The results are summarized in TABLE II.

The results of these tests show the variations in Cu, Ni, and Co extractions with the amount of $SO_2$ added. As the $SO_2$ is increased from 30 to 42% extraction of the Cu, Ni, and Co increased.

TABLE I

CHARGE: 100g raw nodules (−100 mesh) slurried at 15% solids
LEACHING CONDITIONS: 60°C, $SO_2$ fed at 300 ml/min. [2]

| | Reagents (gpl) [1] | | | Time | Extraction, (%) | | |
|---|---|---|---|---|---|---|---|
| Test | $NH_4OH$ | $CO_2$ | $(NH_4)_2SO_4$ | (hr.) | Cu | Ni | Co |
| A | 200 | — | — | 1.0 | 42.4 | 36.3 | 50.0 |
|  |  |  |  | 3.0 | 75.5 | 71.5 | 92.0 |
| B | 200 | — | 132 | 3.0 | 85.6 | 83.1 | 92.0 |
| C | 150 | 100 | — | 1.0 | 65.8 | 52.3 | 55.0 |
|  |  |  |  | 3.0 | 87.5 | 88.1 | 91.5 |
| D | 150 | 100 | — | 1.0 | 47.0 | 50.0 | 63.1 |
|  |  |  |  | 3.0 | 87.5 | 89.5 | 94.0 |

[1] gpl = grams per liter
[2] ml/min. = milliliters per minute

TABLE II

Charge: 100 g. of raw nodules (ground to −100 mesh) slurried at 15% solids in 150 gpl $NH_3$, 100 gpl $CO_2$ solution containing $SO_2$
Leach Conditions: 6 hrs. at 75° C

| | $SO_2$ Weight % | Residue Analyses % | | | Extraction* % | | |
|---|---|---|---|---|---|---|---|
| Test | of Nodules | Cu | Ni | Co | Cu | Ni | Co |
| E | 30 | .26 | .34 | .054 | 72 | 72 | 72 |
| F | 36 | .18 | .19 | .017 | 82 | 85 | 91 |
| G | 42 | .13 | .10 | .008 | 86 | 91 | 96 |

*Fe in solution is <1 ppm
*Mn in solution is <30 ppm

EXAMPLE 3

In a series of tests using elemental sulfur as the reducing agent in an aqueous ammoniacal medium, raw Pacific sea nodules containing 0.83% Cu, 1.10% Ni, 0.24% Co, 7.33% Fe and 21.9% Mn are wet ground and slurried in a reaction medium to provide a pulp density of 15 or 30%. The medium contains 150 g/l $NH_3$, 100 g/l $CO_2$, and various amounts of elemental sulfur ranging from stoichiometric to an excess of 35%. Stoichiometric sulfur is 4.25% by weight of nodules, based on the reaction:

$$3MnO_2 + S° + 3(NH_4)_2CO_3 + 2H_2O \rightarrow 3MnCO_3 + (NH_4)_2SO_4 + 4NH_4OH$$

The elemental sulfur used in these tests was reagent grade sublimed sulfur with 92% - 200 mesh (TSS) particle size. The reaction was maintained at 100° C or 125° C for 6 hours and samples of the reaction mixture were withdrawn at various intervals for analysis. In two tests, (S-E and S-F), after 6 hours of reaction, oxygen was applied to the leach slurry to oxidize and redissolve any copper and nickel sulfides which might have precipitated by reaction with excess elemental sulfur. The effect of variations in conditions and reagents on the results are shown in the typical tests tabulated in TABLE III.

The results in TABLE III show: At the level of reagents used, leaching at 30% solids yields poorer extractions than at 15% solids. At 100° C, increasing the S° from stoichiometric to 5% increases the Ni and Cu extractions, and at 125° C, 5.75% S gives better extractions than 4.25% or 5% S. Subsequent oxidation of the slurry did not increase the extractions indicating that no copper and nickel are precipitated as sulfides with up to 35% excess over the stoichiometric sulfur requirement. No benefit is gained by using sulfur additions in excess of about 6%.

No major differences in the rate of copper and nickel extractions are evident between 100° and 125° C. In general, leaching at 125° C yields higher nickel extractions and lower copper extractions than leaching at 100° C. Extending the leaching time beyond 6 hours may be beneficial at either temperature.

Similar tests with variations in the initial $SO_4^=$ concentration, e.g., 0, 20 and 40 gpl $SO_4^=$ show that sulfate addition is not required for effective extraction of nickel or copper, and, in excess of about 20 gpl, the $SO_4^=$ appears to suppress the reaction. The tests also show that $CO_2$ or a $CO_3^=$ is required to maximize Cu and Ni extractions.

TABLE III

Feed: Nodules; wet ground to 20% +200 mesh
Leachant: aqueous solution with 150 gpl $NH_3$ and 100 gpl $CO_2$
Conditions: 6 hrs. at temperature, 600 rev/min agitation

| Test | Pulp Density (% Solids) | S° Weight (%)[1] | Temp ° C | Time hrs. | Residue Analyses (%) Cu | Ni | Extractions[2] (%) Cu | Ni |
|---|---|---|---|---|---|---|---|---|
| S-A | 30 | 4.25[3] | 100 | 2 | .54 | .69 | 28 | 35 |
| | | | | 4 | .50 | .62 | 33 | 42 |
| | | | | 6 | .49 | .63 | 37 | 43 |
| S-B | 30 | 4.25 | 125 | 2 | .52 | .67 | 34 | 39 |
| | | | | 4 | .56 | .68 | 29 | 38 |
| | | | | 6 | .36 | .46 | 54 | 58 |
| S-C | 15 | 4.25 | 100 | 2 | .41 | .59 | 50 | 48 |
| | | | | 4 | .34 | .52 | 58 | 54 |
| | | | | 6 | .29 | .41 | 65 | 64 |
| S-D | 15 | 4.25 | 125 | 2 | .34 | .53 | 59 | 54 |
| | | | | 4 | .33 | .43 | 59 | 62 |
| | | | | 6 | .30 | .34 | 63 | 69 |
| S-E | 15 | 5.0[4] | 100 | 2 | .34 | .54 | 60 | 51 |
| | | | | 4 | .23 | .34 | 72 | 70 |
| | | | | 6 | .19 | .21 | 77 | 81 |
| | | | | 7[6] | .20 | .23 | 75 | 79 |
| S-F | 15 | 5.0 | 125 | 2 | .35 | .54 | 59 | 51 |
| | | | | 4 | .29 | .34 | 65 | 70 |
| | | | | 6 | .23 | .18 | 71 | 83 |
| | | | | 7[6] | .26 | .20 | 68 | 82 |
| S-G | 15 | 5.75[5] | 100 | 2 | .35 | .59 | 55 | 46 |
| | | | | 4 | .26 | .44 | 67 | 59 |
| | | | | 6 | .18 | .24 | 76 | 78 |
| S-H | 15 | 5.75 | 125 | 2 | .30 | .48 | 61 | 55 |
| | | | | 4 | .23 | .30 | 69 | 72 |
| | | | | 6 | .21 | .13 | 72 | 88 |

[1] By weight of nodules
[2] Product Based
[3] 4.25 wt% S° equiv. to 99.8% stoich.
[4] 5.0 wt% S° equiv. to 117.4% stoich.
[5] 5.75 wt% S° equiv. to 135% stoich.
[6] Oxidized for 1 hr. at temperature with 0.35 MPa (50 psig) $O_2$

EXAMPLE 4

In a series of tests similar to those described in EXAMPLE 3, the nodules are wet ground to minus 100 mesh and subjected to a reductive ammoniacal ammonium carbonate leach. The reducing agent is 5% S° by weight of nodules (dry basis). To improve its reactivity, the reagent grade sublimed sulfur (92% - 200 mesh TSS) was wetted with 0.4% REXOL 25J (a commercially available nonyl phenol polyethoxy ethanol surfactant, product of Hart Chemical Limited, Ontario, Canada, by weight of sulfur, before addition to the slurried nodules. The reaction mixture is maintained at 100° C and at 125° C in a neutral or mildly reducing atmosphere and at a pressure of 0.35 or 0.7 MPa (50 or 100 psig) $NH_3$ + steam, depending on the temperature for 6 hours. The data of typical tests are tabulated in TABLE IV.

The results show that up to 91%, 78% and 59% of Ni, Cu and Co values respectively, can be extracted into the ammoniacal solution. In the ammoniacal media, the Mn and Fe values are quantitatively retained in the leach residue along with the gangue phases. Thus, after flotation to remove excess elemental sulfur, the residue can be reduced and smelted to produce ferromanganese. Alternatively, if desired, manganese carbonate can be recovered.

EXAMPLE 5

In a series of tests similar to those described in EXAMPLE 3, wet ground nodules are subjected to a reductive ammoniacal carbonate leach using ammonium sulfide or ammonium polysulfide (prepared by dissolving reagent grade sublimed sulfur in ammoniacal ammonium sulfide solution) as the reducing agent. The results are given in TABLE V show that ammonium sulfide and polysulfide are effective reducing agents in this process.

TABLE IV

Feed: Pacific Sea Nodules: wet ground to −100 mesh.
Sulfur: Reagent grade sublimed elemental sulfur wetted with 0.4% Rexol 25J by weight of sulfur.
Leachant: 150 gpl $NH_3$, 100 gpl $CO_2$, 20 gpl $SO_4^=$.
Leaching: 15% solids, 5% S° by weight of nodules (dry basis)
  6 hrs. at temperature under anaerobic conditions, then
  1 hr. at temperature with 0.35 MPa (50 psig) $O_2$ partial pressure
  600 rev/min agitation in a Parr 1 liter autoclave.

| Test | Leaching Temperature °C | Weight | Residue Analyses % Ni | Cu | TS | $CO_3$ | Extraction % Ni | Cu | Co |
|---|---|---|---|---|---|---|---|---|---|
| S-I | 100 | 100.5 | 0.14 | 0.19 | 0.28 | 25.8 | 87 | 78 | 59 |
| S-J | 125 | 100.9 | 0.10 | 0.23 | 0.46 | 25.5 | 91 | 73 | 48 |

[1] By weight of nodules (dry basis).

TABLE V

Nodules: 0.78% Cu, 1.12% Ni, 0.22% Co. 7.5% Fe, 23.6% Mn
  (Wet ground, 20.3% +200 mesh)
Reductant: A. Ammoniacal ammonium sulfide solution (200 g $(NH_4)_2S/l$)
  B. Ammoniacal ammonium polysulfide solution (450 g $(NH_4)_2S_{3.8}/l$)
Leaching: 15% solids in ammmoniacal ammonium carbonate solution (150 g $NH_3/l$
  100 g $CO_2/l$) 6 hrs. at 100° C under a neutral atmosphere, 600 rev/min agitation.

| Test | Reductant | $(S^= + S^o)^*$ Weight % | Time hrs. | Residue Analyses % Cu | Ni | Extractions % Cu | Ni | Co |
|---|---|---|---|---|---|---|---|---|
| S-K | $(NH_4)_2S$ | 3.8 | 6 | 0.19 | 0.04 | 76 | 97 | 38 |
| S-L | $(NH_4)_2S_{3.8}$ | 4.6 | 2 | 0.19 | 0.31 | 76 | 73 | 32 |
|  |  |  | 4 | 0.17 | 0.22 | 78 | 81 | 42 |
|  |  |  | 6 | 0.16 | 0.17 | 80 | 85 | 51 |

*Equivalent to 5% S° by weight of nodules.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A process for extracting nickel, cobalt, copper and molybdenum values from raw sea nodules containing a major amount of manganese and iron, manganese being present in tetravalent state and a lesser amount of at least one of the nonferrous metals nickel, cobalt, copper and molybdenum comprising leaching said raw nodules in an aqueous ammoniacal medium at a pH of not less than about 8 in the presence of a reducing agent for tetravalent manganese selected from the group consisting of $H_2S$, $(NH_4)_2S$, ammonium polysulfide, and combinations thereof and in the presence of a manganous carbonate precipitant selected from the group consisting of $CO_2$, $(NH_4)_2CO_3$, and an alkali metal carbonate, at a temperature in the range of about 50° C to about 125° C and pressure of atmospheric to about 100 psig, to convert tetravalent manganese to the divalent state, extract nickel, cobalt, copper and molybdenum values into the leach solution and to separate manganese and iron values into the leach residue, said leaching reaction condition being maintained for a period of time sufficient to maximize said extraction of nickel, cobalt, copper and molybdenum values into solution and separation of manganese and iron values into the leach residue.

2. A process according to claim 1 wherein the sea nodules are provided in the leaching medium in sufficient amount to provide a slurry containing about 10% to 30% solids the carbonate and ammoniacal values are provided to the medium as $CO_2$ and $NH_3$, said $CO_2$ and $NH_3$ being supplied in an amount to provide about 60 to 200 gpl $NH_3$ and about 40 to about 150 gpl $CO_2$, and wherein the sea nodules are leached at a temperature of about 100° C to about 125° C at a pressure in the range of about 50 to about 100 psig for about 6 to 10 hours.

3. A process for extracting nickel, cobalt, copper and molybdenum values from a manganiferous ore containing a major amount of manganese and iron, manganese being present in tetravalent form, and a lesser amount of at least one of the nonferrous metals nickel, cobalt, copper and molybdenum comprising leaching said ore in an aqueous ammoniacal medium at a pH of not less than about 8 in the presence of a reducing agent comprising a sulfide, said sulfide being selected from the group consisting of $H_2S$, $(NH_4)_2S$ and ammonium polysulfide, at reaction conditions to convert tetravalent manganese to the divalent state and in the presence of a carbonate capable of forming substantially insoluble manganous carbonate in the ammoniacal medium, whereby at least one of the nonferrous metal values nickel, cobalt, copper and molybdenum is extracted into the leach solution and the manganese and iron values are separated into the leach residue.

4. A process according to claim 3 wherein the manganiferous ore comprises sea nodules and said nodules are ground and introduced in the raw condition into the leaching medium.

5. A process according to claim 3 wherein the carbonate is provided by a reagent selected from the group consisting of $CO_2$, $(NH_4)_2CO_3$, and an alkali metal carbonate.

6. A process according to claim 3 wherein the leaching reactants are maintained at a temperature of about 25° to about 130° C for a period of time sufficient to maximize said extraction of nickel, cobalt and copper values into solution and separation of manganese and iron values into the residue.

7. A process according to claim 3 wherein the ammoniacal leaching medium is maintained at a pH between 8 and about 9.

8. A process according to claim 4 wherein the solids content of the slurry is in the range of about 10% to about 30%.

9. A process according to claim 4 wherein $NH_3$ and $CO_2$ provide the ammoniacal medium and the carbonate reagent, and said $NH_3$ is supplied to the leaching medium in an amount to provide about 60 to about 200 gpl, and said $CO_2$ in an amount to provide about 40 to about 150 gpl.

10. A process according to claim 3 wherein the temperature is maintained at about 100° to about 125° C.

11. A process for extracting nickel, cobalt, copper and molybdenum values from a manganiferous ore containing a major amount of manganese and iron, maganese being present in tetravalent form and a lesser amount of at least one of the nonferrous metals nickel, cobalt, copper and molybdenum comprising leaching said ore in an aqueous ammoniacal medium at a pH of not less than about 8 in the presence of a reducing agent comprising a sulfide soluble in said ammoniacal medium at reaction conditions to convert tetravalent manganese to the divalent state and in the presence of a carbonate capable of forming substantially insoluble manganous carbonate in the ammoniacal medium, whereby at least one of the nonferrous metal values nickel, cobalt, copper and molybdenum is extracted into the leach solution and the manganese and iron values are separated into the leach residue.

* * * * *